US009906593B2

(12) United States Patent
Ohashi

(10) Patent No.: US 9,906,593 B2
(45) Date of Patent: Feb. 27, 2018

(54) INFORMATION PROCESSING APPARATUS, SYSTEM AND PROGRAM FOR ENABLING MULTIPLE DEVICES TO OPERATE IN COORDINATION WITH EACH OTHER

(75) Inventor: Yoshinori Ohashi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 121 days.

(21) Appl. No.: 14/122,379

(22) PCT Filed: May 29, 2012

(86) PCT No.: PCT/JP2012/003490
§ 371 (c)(1),
(2), (4) Date: Nov. 26, 2013

(87) PCT Pub. No.: WO2012/172740
PCT Pub. Date: Dec. 20, 2012

(65) Prior Publication Data
US 2014/0214965 A1    Jul. 31, 2014

(30) Foreign Application Priority Data

Jun. 14, 2011   (JP) ................................ 2011-132071

(51) Int. Cl.
*G06F 15/16*     (2006.01)
*H04L 29/08*     (2006.01)
(Continued)

(52) U.S. Cl.
CPC ...... *H04L 67/104* (2013.01); *G06F 17/30876* (2013.01); *H04L 67/34* (2013.01);
(Continued)

(58) Field of Classification Search
CPC .................................................. H04L 67/104
(Continued)

(56) References Cited

U.S. PATENT DOCUMENTS 5,752,076 A * 5/1998 Munson ................ G06F 13/385
710/4
6,252,858 B1 * 6/2001 Inoue .................. H04L 41/0843
370/254
(Continued)

FOREIGN PATENT DOCUMENTS

CN         1902608 A      1/2007
CN       101978654 A      2/2011
(Continued)

OTHER PUBLICATIONS

Japanese Office Action for Appln. No. JP2011-132071 dated Oct. 6, 2016.
(Continued)

*Primary Examiner* — Michael Y Won
(74) *Attorney, Agent, or Firm* — Lerner, David, Littenberg, Krumholz & Mentlik, LLP

(57) ABSTRACT

An information processing device is disclosed. The information processing device includes an identifier acquisition unit configured to receive an identifier of an associated device, and an application specifier generation unit. The application specifier generation unit is configured to generate a first application specifier identifying a first application corresponding to the information processing device, and a second application specifier based on the received identifier and identifying a second application corresponding to the associated device. The information processing device further includes a transmission unit configured to transmit the first and second application specifiers to a server, and an application reception unit configured to receive the first application.

9 Claims, 10 Drawing Sheets

(51) Int. Cl.
   *G06F 17/30* (2006.01)
   *H04N 21/41* (2011.01)
   *H04N 21/422* (2011.01)
   *H04N 21/81* (2011.01)

(52) U.S. Cl.
   CPC ..... *H04N 21/4126* (2013.01); *H04N 21/4222* (2013.01); *H04N 21/42226* (2013.01); *H04N 21/8186* (2013.01)

(58) Field of Classification Search
   USPC ................................. 709/205, 203, 219, 238
   See application file for complete search history.

(56) References Cited

U.S. PATENT DOCUMENTS

| | | | |
|---|---|---|---|
| 6,836,787 B1 * | 12/2004 | Kasai | G06F 3/14 345/418 |
| 7,200,387 B1 * | 4/2007 | Ephraim | H04M 1/72572 455/404.2 |
| 7,428,574 B2 | 9/2008 | Watanabe et al. | |
| 7,429,973 B2 | 9/2008 | Ota et al. | |
| 7,831,734 B2 * | 11/2010 | Bernhard et al. | 709/248 |
| 8,510,784 B2 | 8/2013 | Fukuda et al. | |
| 9,253,083 B2 * | 2/2016 | Kusama | H04L 12/437 |
| 2003/0043112 A1 | 3/2003 | Ota et al. | |
| 2003/0156053 A1 | 8/2003 | Wall et al. | |
| 2005/0118987 A1 * | 6/2005 | Isozaki | G06F 21/10 455/412.1 |
| 2008/0301736 A1 * | 12/2008 | Heilbron | G06F 17/30867 725/61 |
| 2009/0234997 A1 * | 9/2009 | Macchi | H04L 12/40006 710/106 |
| 2010/0235430 A1 * | 9/2010 | Kim | H04M 1/72522 709/203 |
| 2010/0322258 A1 * | 12/2010 | Dynarski | H04L 69/18 370/401 |
| 2011/0053618 A1 * | 3/2011 | Lin | H04L 12/585 455/466 |
| 2011/0231542 A1 * | 9/2011 | Komano et al. | 709/224 |
| 2012/0046761 A1 * | 2/2012 | Ichikawa | G03B 15/02 700/14 |
| 2012/0209916 A1 | 8/2012 | Azuma et al. | |
| 2012/0317261 A1 * | 12/2012 | Ahmavaara | H04L 63/0815 709/223 |
| 2013/0124309 A1 * | 5/2013 | Traasdahl | H04L 67/22 705/14.49 |
| 2013/0139095 A1 * | 5/2013 | Li | H04L 67/36 715/778 |
| 2013/0198772 A1 * | 8/2013 | Wang | H04H 20/18 725/32 |
| 2014/0280814 A1 * | 9/2014 | Maity | H04L 41/022 709/223 |
| 2015/0088663 A1 * | 3/2015 | Schechter | G06Q 30/0271 705/14.67 |
| 2015/0264634 A1 * | 9/2015 | Ding | H04W 4/001 455/434 |
| 2015/0381452 A1 * | 12/2015 | Deen | H04L 43/0876 709/224 |

FOREIGN PATENT DOCUMENTS

| | | |
|---|---|---|
| EP | 1705576 A1 | 9/2006 |
| EP | 1956572 A1 | 8/2008 |
| JP | 2002-358260 A | 12/2002 |
| JP | 2009-225070 A | 10/2009 |
| JP | 2011-086232 A | 4/2011 |
| RU | 2280274 C2 | 7/2006 |
| WO | 2005-066808 A1 | 7/2005 |
| WO | 2011048947 A1 | 4/2011 |

OTHER PUBLICATIONS

Chinese Office Action for Appln. No. CN201280025971.0 dated Oct. 10, 2015.
Chinese Office Action for Appln. No. CN201280025971.0 dated Jun. 17, 2016.
Chinese Office Action for Appln. No. CN201280025971.0 dated Dec. 28, 2016.

* cited by examiner

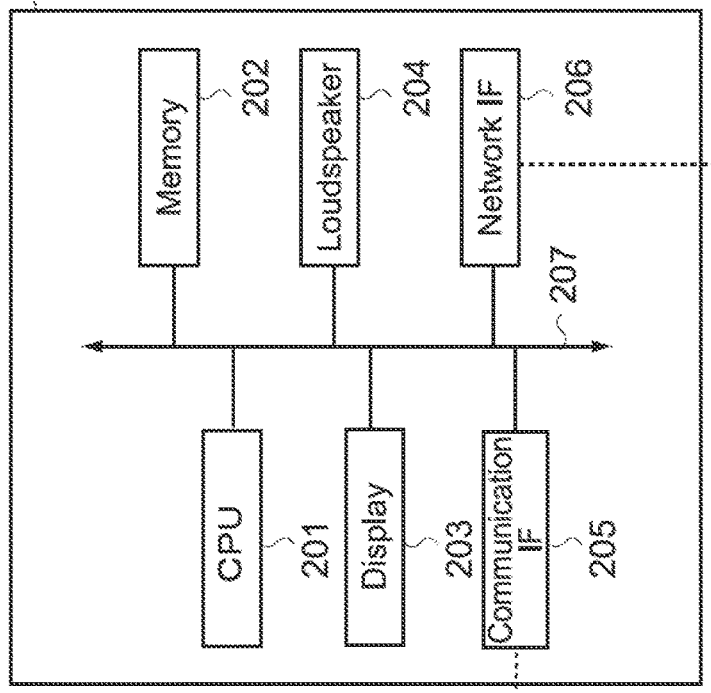
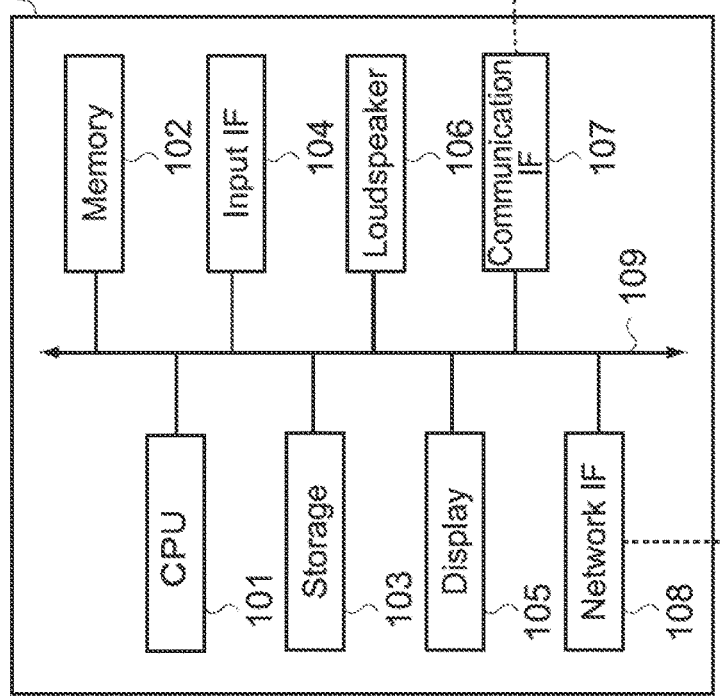
FIG.4

INFORMATION PROCESSING APPARATUS, SYSTEM AND PROGRAM FOR ENABLING MULTIPLE DEVICES TO OPERATE IN COORDINATION WITH EACH OTHER

CROSS-REFERENCE TO RELATED APPLICATION

The present application is a national phase entry under 35 U.S.C. § 371 of International Application No. PCT/JP2012/003490 filed May 29, 2012, published on Dec. 20, 2012, as WO 2012/172740 A1, which claims priority from Japanese Patent Application No. JP 2011-132071 filed in the Japanese Patent Office on Jun. 14, 2011.

TECHNICAL FIELD

The present disclosure relates to an information processing apparatus used for accessing content on a network, an information processing system including the information processing apparatus, and a program for the information processing apparatus.

BACKGROUND ART

Recently, in addition to a computer, various information processing apparatuses including a television set and a cellular phone have been capable of accessing a network (Internet etc.). Along with such diversity of network connection devices, a network use method in which users use a plurality of devices at the same time to access a single content item (moving image, music, game, etc.) is anticipated to be widespread.

For example, Patent Literature 1 described below discloses a cooperative processing system and the like in which a personal digital assistant and a viewing apparatus are coordinated with each other. In this system, it is possible to display or operate information of content that is being reproduced in the viewing apparatus on the personal digital assistant via a network.

CITATION LIST

Patent Literature

[PTL 1]
Japanese Patent Application Laid-open No. 2009-225070 (paragraph [0090], FIG. 1)

SUMMARY OF INVENTION

However, in the cooperative processing system and the like disclosed in Patent Literature 1, the cooperation between the viewing apparatus and the personal digital assistant is achieved by a device control server interposed therebetween. In other words, in order to achieve cooperative processing, it is necessary to prepare a device control server in addition to a content server that stores content.

Meanwhile, in the case where a plurality of devices are connected to a content server generally used, each time each of the devices requests transmission of information, the content server individually transmits the information to the device. Therefore, even when users use a plurality of devices to access the same content item, an operation made by a single device is not reflected on the other devices, that is, those devices are not coordinated with each other.

Accordingly, an information processing device is disclosed. The information processing device includes an identifier acquisition unit configured to receive an identifier of an associated device, and an application specifier generation unit. The application specifier generation unit is configured to generate a first application specifier identifying a first application corresponding to the information processing device, and a second application specifier based on the received identifier and identifying a second application corresponding to the associated device. The information processing device further includes a transmission unit configured to transmit the first and second application specifiers to a server, and an application reception unit configured to receive the first application.

In another aspect, an information processing system is disclosed. The information processing system includes an associated information processing device, and an information processing device. The information processing device includes an identifier acquisition unit configured to receive an identifier of the associated device, and an application specifier generation unit. The application specifier generation unit is configured to generate a first application specifier identifying a first application corresponding to the information processing device, and a second application specifier based on the received identifier of the associated device and identifying a second application corresponding to the associated device. The information processing device further includes a transmission unit configured to transmit the first and second application specifiers to a server, and an application reception unit configured to receive the first application from the server.

In yet another aspect, an information processing system is disclosed. The information processing system includes a server, and an information processing device in communication with the server. The information processing device includes an identifier acquisition unit configured to receive an identifier of the associated device, and an application specifier generation unit. The application specifier generation unit is configured to generate a first application specifier identifying a first application corresponding to the information processing device, and a second application specifier based on the received identifier of the associated device and identifying a second application corresponding to the associated device. The information processing device further includes a transmission unit configured to transmit the first and second application specifiers to a server, and an application reception unit configured to receive the first application from the server.

In another aspect, an information processing device is disclosed. The information processing device includes an identifier transmission unit configured to transmit an identifier of the device, an application specifier reception unit configured to receive an application specifier identifying a second application corresponding to the device, a transmission unit configured to transmit the application specifier to a server, and an application reception unit configured to receive the application.

In yet another aspect, a method of accessing content on a network is disclosed. The method includes receiving an identifier of a device associated with an information processing device, generating a first application specifier identifying a first application corresponding to the information processing device, and generating a second application specifier based on the received identifier and identifying a second application corresponding to the associated device. The method further includes transmitting the first and second application specifiers to a server, and receiving the first application in the information processing device.

In another aspect, a non-transitory computer-readable medium is described. The computer readable medium includes a program for causing a computer to function as a unit for receiving an identifier of an associated device, and a unit for generating a first application specifier identifying a first application corresponding to an information processing device, and a second application specifier based on the received identifier and identifying a second application corresponding to the associated device. The computer readable medium further includes a unit for transmitting the first and second application specifiers to a server; and a unit for receiving the first application.

As described above, according to the present disclosure, it is possible to provide an information processing apparatus, an information processing system, and a program that are capable of cooperative use of content on a network.

BRIEF DESCRIPTION OF DRAWINGS

FIG. 4 is a block diagram showing a hardware configuration of the information processing system.

DESCRIPTION OF EMBODIMENTS

First Embodiment

An information processing system according to a first embodiment of the present disclosure will be described.
<Configuration of Information Processing System>

Figure 1:
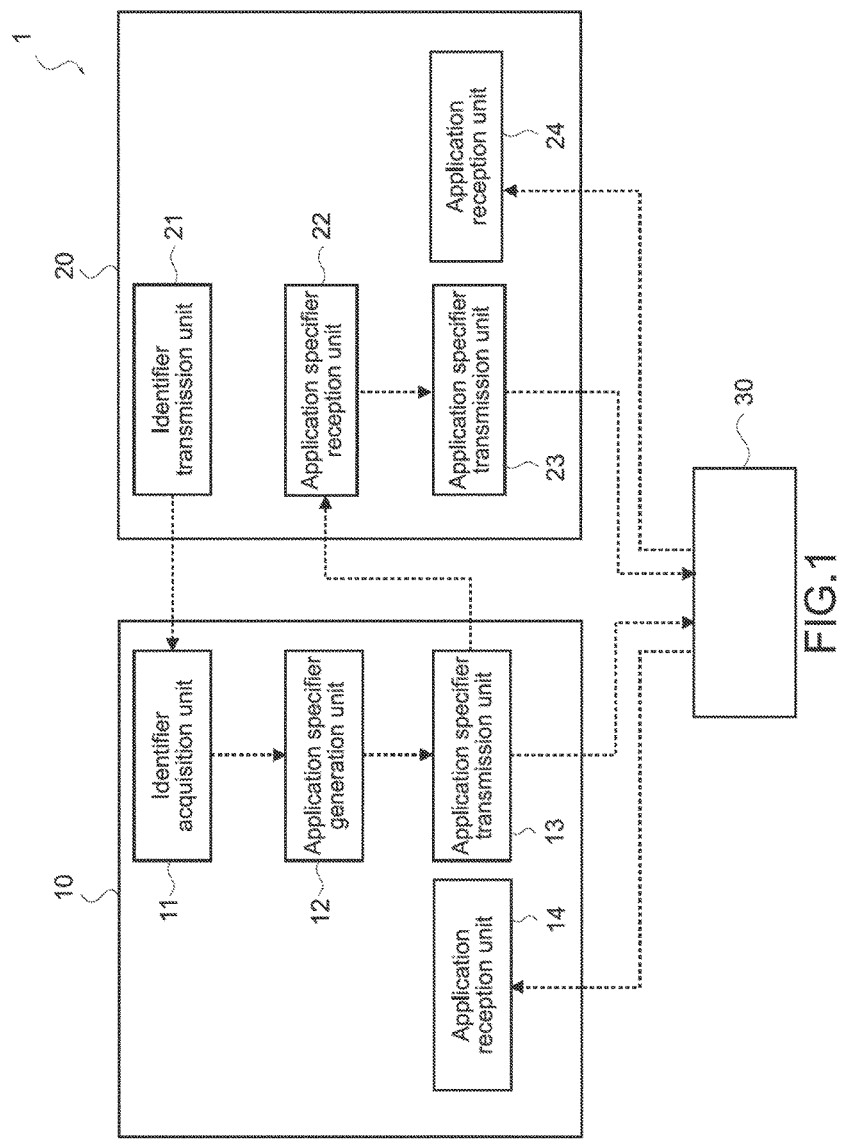
FIG. 1 is a block diagram showing a functional configuration of an information processing system according to a first embodiment of the present disclosure.
Figure 2:
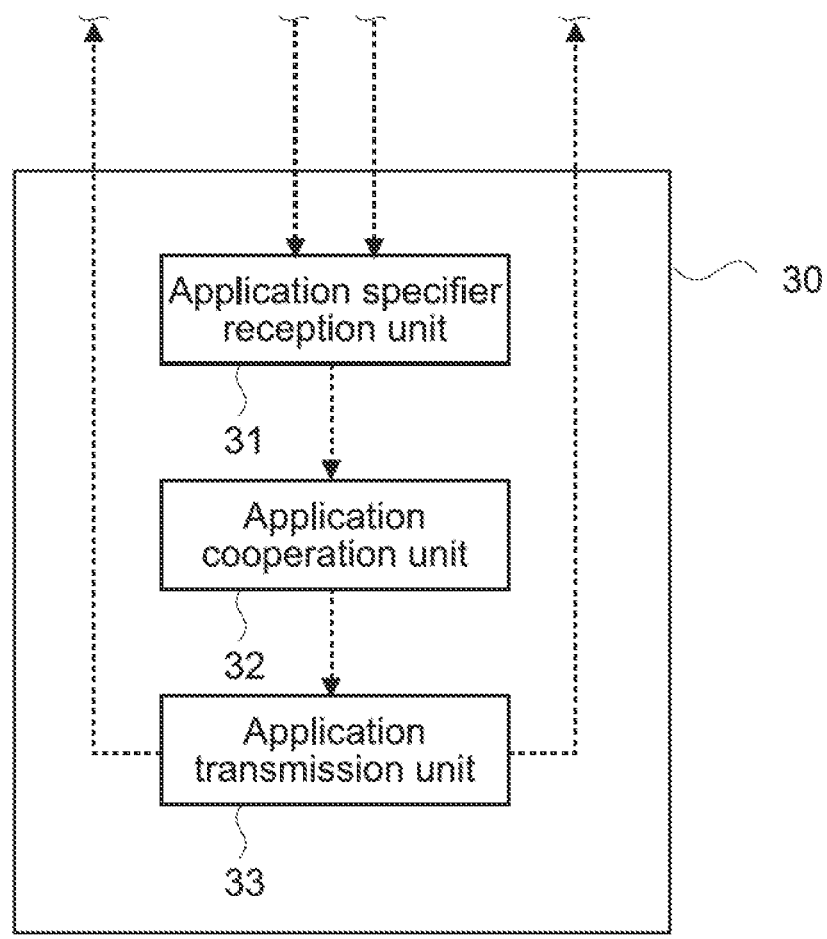
FIG. 2 is a block diagram showing a functional configuration of the information processing system.
Figure 3:
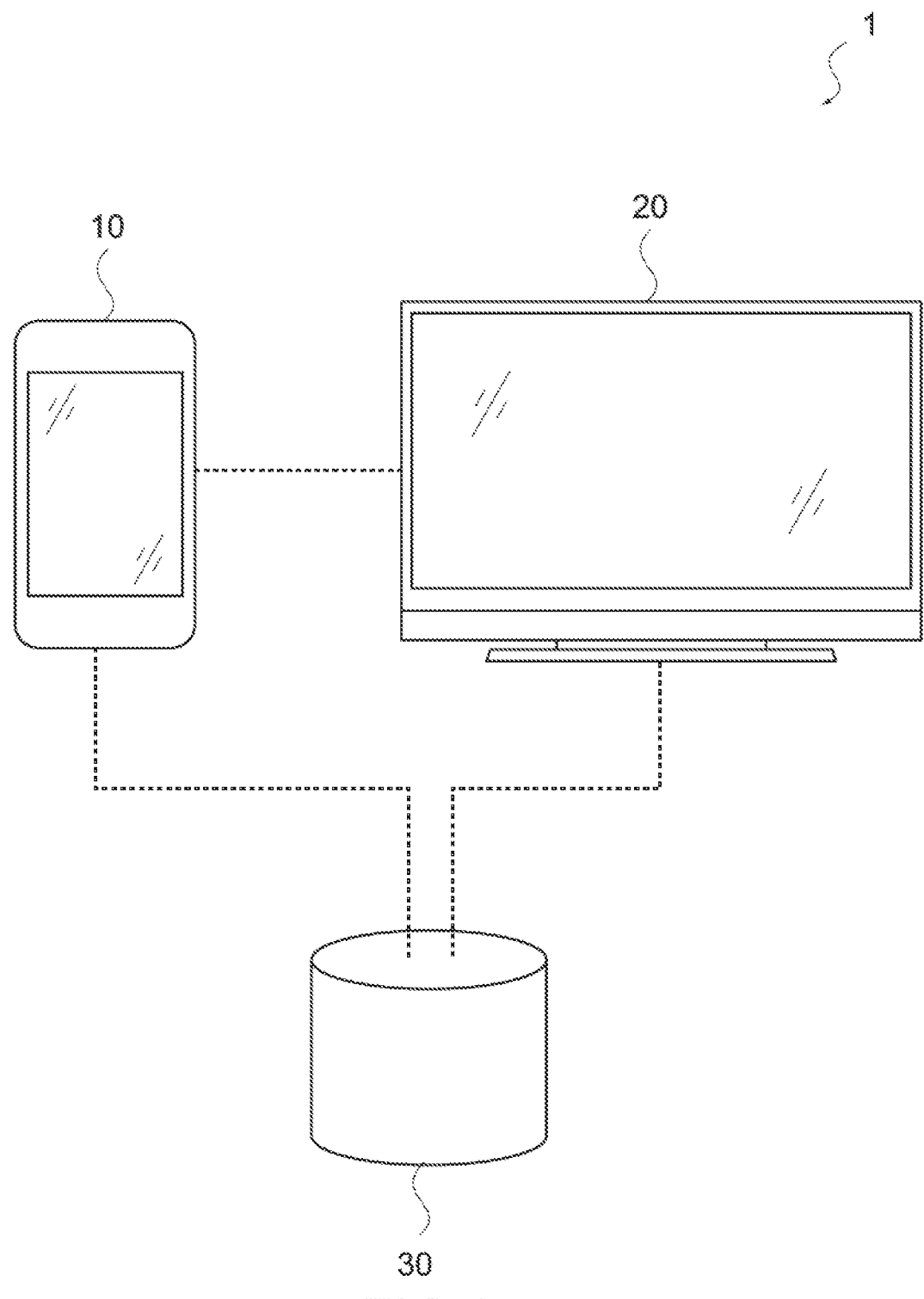
FIG. 3 is a schematic diagram showing a configuration of apparatuses of the information processing system.

FIG. 1 and FIG. 2 are block diagrams each showing a functional configuration of an information processing system 1. FIG. 3 is a schematic diagram showing a configuration of apparatuses of the information processing system 1.

As shown in FIG. 3, the information processing system 1 includes an information processing apparatus 10, an information processing apparatus 20 (that is, an associated information processing device), and a server 30. The information processing apparatus 10 and the information processing apparatus 20 are not particularly limited as long as they are information processing apparatuses having a functional configuration to be described later. The information processing apparatus 10 and the information processing apparatus 20 may be a personal digital assistant, a tablet PC (Personal Computer), a stationary PC, a television set (that is, a television receiver), having a network connection function, an audio device having a network connection function, and the like.

Hereinafter, description will be given assuming that the information processing apparatus 10 is a personal digital assistant and the information processing apparatus 20 is a television set having a network connection function. The server 30 is a server capable of being connected to the information processing apparatus 10 and the information processing apparatus 20 via a network, and is typically a web server.

[Functional Configuration of Information Processing System]

As shown in FIG. 1, the information processing apparatus 10 includes an identifier acquisition unit 11, an application specifier generation unit 12, an application specifier transmission unit 13, and an application reception unit 14. The identifier acquisition unit 11 is connected to the application specifier generation unit 12. The application specifier generation unit 12 is connected to the application specifier transmission unit 13.

As used herein, the term unit includes a software module, a hardware module, or a combination of a software module and a hardware module.

The identifier acquisition unit 11 acquires (that is, receives), a "second device identifier", which is a device identifier of the information processing apparatus 20, from the information processing apparatus 20. The device identifier is an identifier unique to a device and is, for example, a MAC (Media Access Control) address. The identifier acquisition unit 11 supplies the acquired second device identifier to the application specifier generation unit 12.

The application specifier generation unit 12 generates a "first application specifier" and a "second application specifier". The first application specifier is an application specifier for the information processing apparatus 10 and is generated using a "content specifier", a "first device identifier", a "second device identifier", and "first role information". The second application specifier is an application specifier for the information processing apparatus 20 and is generated using the "content specifier", the "second device identifier", and "second role information".

Specifically, the content specifier is information for specifying a location of content (game, moving image, music, web site, etc.) in the server 30, and is typically a URL (Uniform Resource Locator). In addition thereto, the content specifier can be an HTTP (HyperText Transfer Protocol) request and the like. The content specifier can be directly input by a user or automatically generated when a user specifies content.

The first device identifier is a device identifier of the information processing apparatus 10 and can be held in advance by the information processing apparatus 10. The second device identifier can be set to one acquired by the identifier acquisition unit 11 from the information processing apparatus 20, as described above. Further, the first device identifier and the second device identifier can be assigned by the server 30.

The first role information is information that indicates a role of the information processing apparatus 10. For example, the first role information can be information ("Control") indicating that the information processing apparatus 10 is a controller. The first role information can be specified by a user.

The second role information is information that indicates a role of the information processing apparatus 20. For example, the second role information can be information ("View") indicating that the information processing apparatus 20 is a viewer. The second role information can be specified by a user.

The first role information and the second role information can be selected from the following various kinds of role information in accordance with content.

Display of outline: SummaryView
Comprehensive display: OverheadView
Display of related information: InformationView
Display of history information: HistoryView
Immediately preceding display: PreviousView
Display of help information: HelpView
Menu selection: MenuContorol
Authorized operation: MasterControl As such role information, information supported by the server, which is obtained when the information processing apparatus 10 inquires from the server, can be used.

The application specifier generation unit 12 adds a "first device identifier", a "second device identifier", and "first role information" to a "content specifier" to thereby generate a "first application specifier". Further, the application specifier generation unit 12 adds the "second device identifier" and "second role information" to the "content specifier" to thereby generate a "second application specifier". The application specifier generation unit 12 supplies the generated first application specifier and second application specifier to the application specifier transmission unit 13.

The application specifier transmission unit 13 transmits the first application specifier to the server 30 and transmits the second application specifier to the information processing apparatus 20.

The application reception unit 14 receives a first application output from the server 30. The first application will be described later in detail. The information processing apparatus 10 operates the received first application.

The information processing apparatus 10 has the functional configuration as described above. Such a functional configuration of the information processing apparatus 10 is achieved by a hardware configuration to be described later.

As shown in FIG. 1, the information processing apparatus 20 includes an identifier transmission unit 21, an application specifier reception unit 22, an application specifier transmission unit 23, and an application reception unit 24. The application specifier reception unit 22 is connected to the application specifier transmission unit 23.

Upon reception of an inquiry from the identifier acquisition unit 11 of the information processing apparatus 10, the identifier transmission unit 21 transmits a second device identifier held in advance by the information processing apparatus 20 to the identifier acquisition unit 11.

The application specifier reception unit 22 receives the second application specifier transmitted from the application specifier transmission unit 13. The application specifier reception unit 22 supplies the received second application specifier to the application specifier transmission unit 23.

The application specifier transmission unit 23 transmits the second application specifier supplied from the application specifier reception unit 22, to the server 30.

The application reception unit 24 receives a second application output from the server 30. The second application will be described later in detail. The information processing apparatus 20 operates the received second application.

The information processing apparatus 20 has the functional configuration as described above. Such a functional configuration of the information processing apparatus 20 is achieved by a hardware configuration to be described later.

As shown in FIG. 2, the server 30 includes an application specifier reception unit 31, an application cooperation unit 32, and an application transmission unit 33. The application specifier reception unit 31 is connected to the application cooperation unit 32, and the application cooperation unit 32 is connected to the application transmission unit 33.

The application specifier reception unit 31 receives the first application specifier transmitted from the application specifier transmission unit 13 and the second application specifier transmitted from the application specifier transmission unit 23. The application specifier reception unit 31 supplies the first application specifier and the second application specifier to the application cooperation unit 32.

The application cooperation unit 32 can determine that the information processing apparatus 10 and the information processing apparatus 20 are coordinated with each other on the basis of the fact that the first application specifier and the second application specifier each include the second device identifier. Accordingly, the application cooperation unit 32 coordinates the "first application" and the "second application" with each other. It should be noted that the word "coordinate" means that two applications are synchronized with each other or information given by one application is shared with the other application.

Specifically, the application cooperation unit 32 searches for content specified by the content specifier included in the first application specifier and the second application specifier. Then, the application cooperation unit 32 selects a first application included in the content in accordance with the first role information included in the first application specifier. For example, in the case where the first role information is "Control", an application for operating the content can be used as a first application.

Further, the application cooperation unit 32 selects a second application included in the content in accordance with the second role information included in the second application specifier. For example, in the case where the second role information is "View", an application for viewing the content can be used as a second application. The application cooperation unit 32 coordinates the first application and the second application with each other and then supplies those applications to the application transmission unit 33.

The first application and the second application are selected as appropriate in accordance with the type of content. Examples of the type of content include "wide display" and "detail display" in the case where content is a map, "display of stock" and "display of hand" in the case where content is a card game, "music reproduction" and "operation interface" in the case where content is music, and "display of site" and "display of view history" in the case where content is a web site.

The application transmission unit 33 transmits the first application to the application reception unit 14 and transmits the second application to the application reception unit 24.

The server 30 has the functional configuration as described above. Such a functional configuration of the server 30 is achieved by a hardware configuration to be described later.

[Hardware Configuration of Information Processing System]

Figure 5:
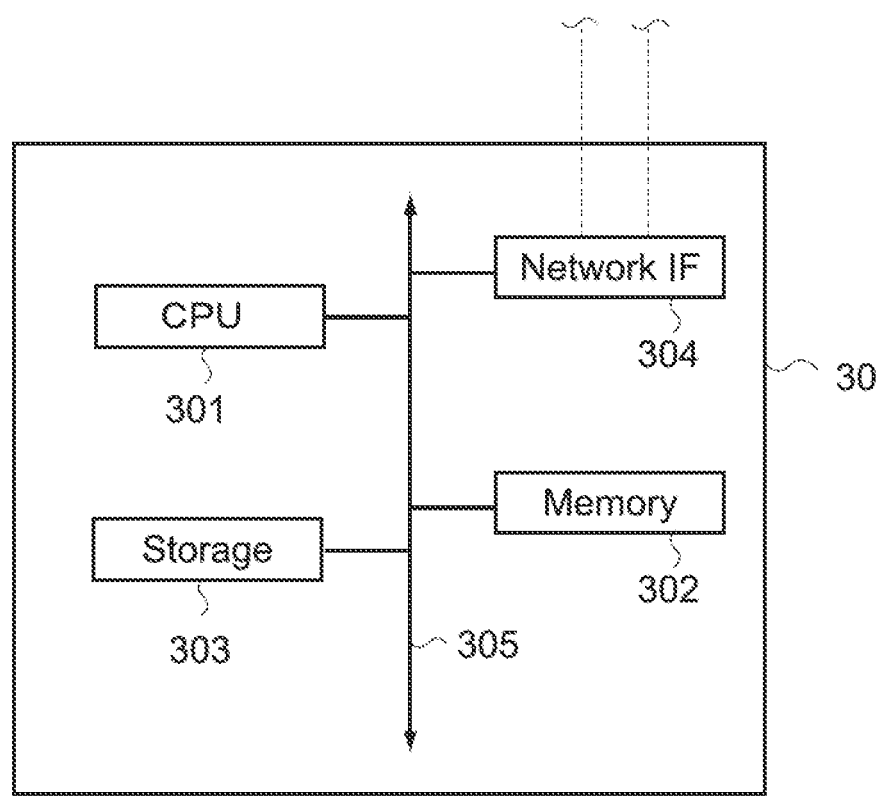
FIG. 5 is a block diagram showing a hardware configuration of the information processing system.

FIG. 4 and FIG. 5 are block diagrams showing a hardware configuration of the information processing system 1. It should be noted that the hardware configuration shown in FIG. 4 and FIG. 5 is merely an example, and another configuration with which the functional configuration of the information processing system 1 can be achieved can also be adopted.

As shown in FIG. 4, the information processing apparatus 10 includes a CPU (Central Processing Unit) 101, a memory 102 (that is, non-transitory computer readable medium), a storage 103, an input IF (interface) 104, a display 105, a loudspeaker 106, a communication IF 107, and a network IF 108. Those components are connected to one another by a bus 109.

The CPU 101 reads out a program from the memory 102 and executes computation processing. In other words, the information processing apparatus 10 functions with the CPU 101 serving as a subject of operation. The memory 102 is a main storage such as a DRAM (Dynamic Random Access Memory).

The storage 103 is an auxiliary storage such as an HDD (Hard Disk Drive) or an SSD (Solid State Drive). The input IF 104 can be an input device such as a touch panel, a keyboard, or a mouse. The display 105 can be a display device such as a liquid crystal display. The loudspeaker 106 can be a loudspeaker generally used.

The communication IF 107 is a device capable of communicating with the information processing apparatus 20 and can be an infrared communication device or a near field communication device, for example. The communication IF 107 can be used for communication between the identifier acquisition unit 11 and the identifier transmission unit 21 and communication between the application specifier transmission unit 13 and the application specifier reception unit 22 in the functional configuration.

The network IF 108 is a device capable of connecting to a network and can be a wired or wireless LAN (Local Area Network) port, for example. The network IF 108 can be used for communication between the application specifier transmission unit 13 and the application specifier reception unit 31 and communication between the application transmission unit 33 and the application reception unit 14 in the functional configuration.

As shown in FIG. 4, the information processing apparatus 20 includes a CPU 201, a memory 202 (that is, non-transitory computer readable medium), a display 203, a loudspeaker 204, a communication IF 205, and a network IF 206. Those components are connected to one another by a bus 207.

The CPU 201 reads out a program from the memory 202 and executes computation processing. In other words, the information processing apparatus 20 functions with the CPU 201 serving as a subject of operation. The memory 202 is a main storage such as a DRAM. The display 203 can be a display device such as a liquid crystal display. The loudspeaker 204 can be a loudspeaker generally used.

The communication IF 205 is a device capable of communicating with the information processing apparatus 10 and can be an infrared communication device or a near field communication device, for example. The communication IF 205 can be used for communication between the identifier acquisition unit 11 and the identifier transmission unit 21 and communication between the application specifier transmission unit 13 and the application specifier reception unit 22 in the functional configuration.

The network IF 206 is a device capable of connecting to a network and can be a wired or wireless LAN port, for example. The network IF 206 can be used for communication between the application specifier transmission unit 23 and the application specifier reception unit 31 and communication between the application transmission unit 33 and the application reception unit 24 in the functional configuration.

As shown in FIG. 5, the server 30 includes a CPU 301, a memory 302 (that is, non-transitory computer readable medium), a storage 303, and a network IF 304. Those components are connected to one another by a bus 305.

The CPU 301 reads out a program from the memory 302 and executes computation processing. In other words, the server 30 functions with the CPU 301 serving as a subject of operation. The memory 302 is a main storage such as a DRAM. The storage 303 is an auxiliary storage such as an HDD or SSD.

The network IF 304 is a device capable of connecting to a network and can be a wired or wireless LAN port, for example. The network IF 304 can be used for communication between the application specifier transmission unit 13 or application specifier transmission unit 23 and the application specifier reception unit 31 and communication between the application transmission unit 33 and the application reception unit 14 or application reception unit 24 in the functional configuration.

<Operation of Information Processing System>

Figure 6:
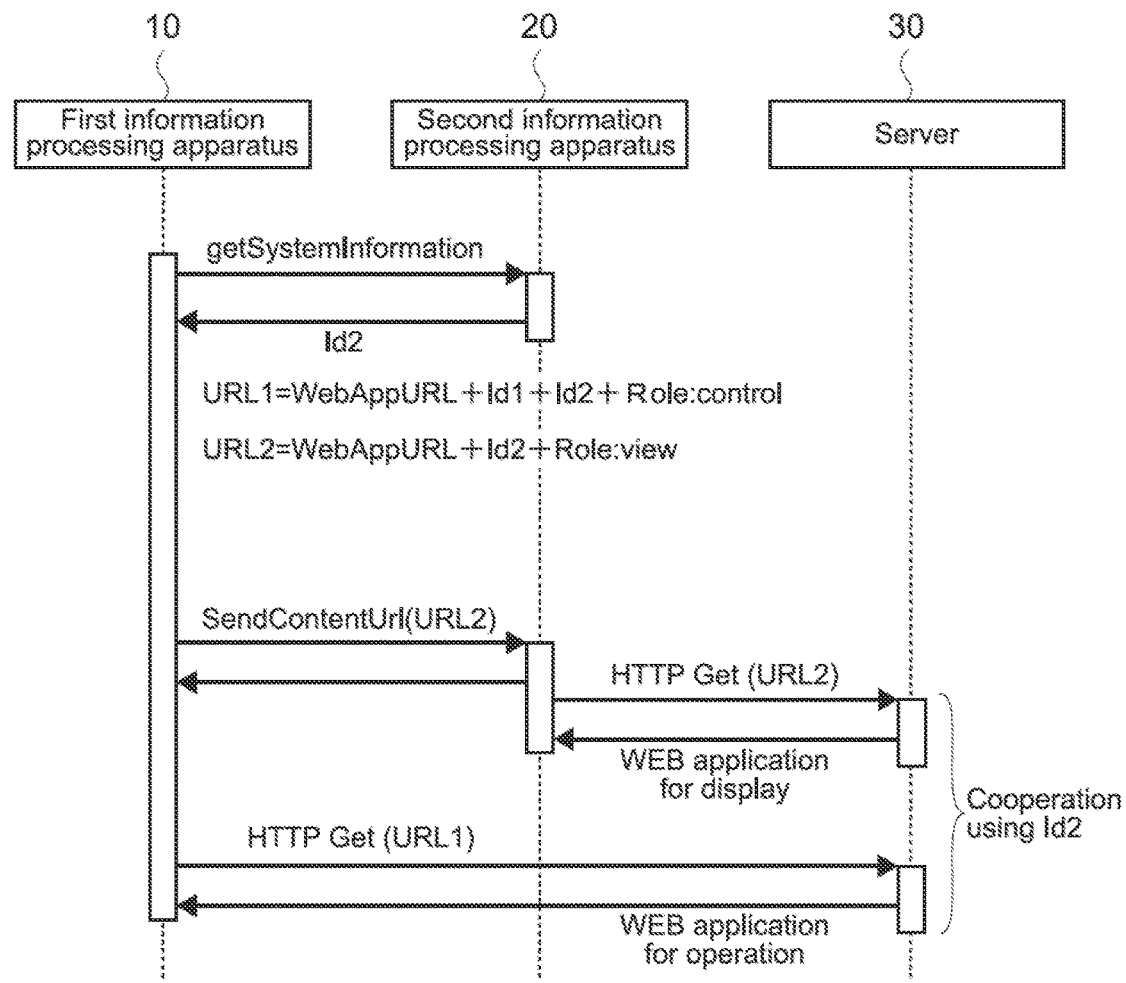
FIG. 6 is a sequence diagram showing operation of the information processing system.
Figure 7:
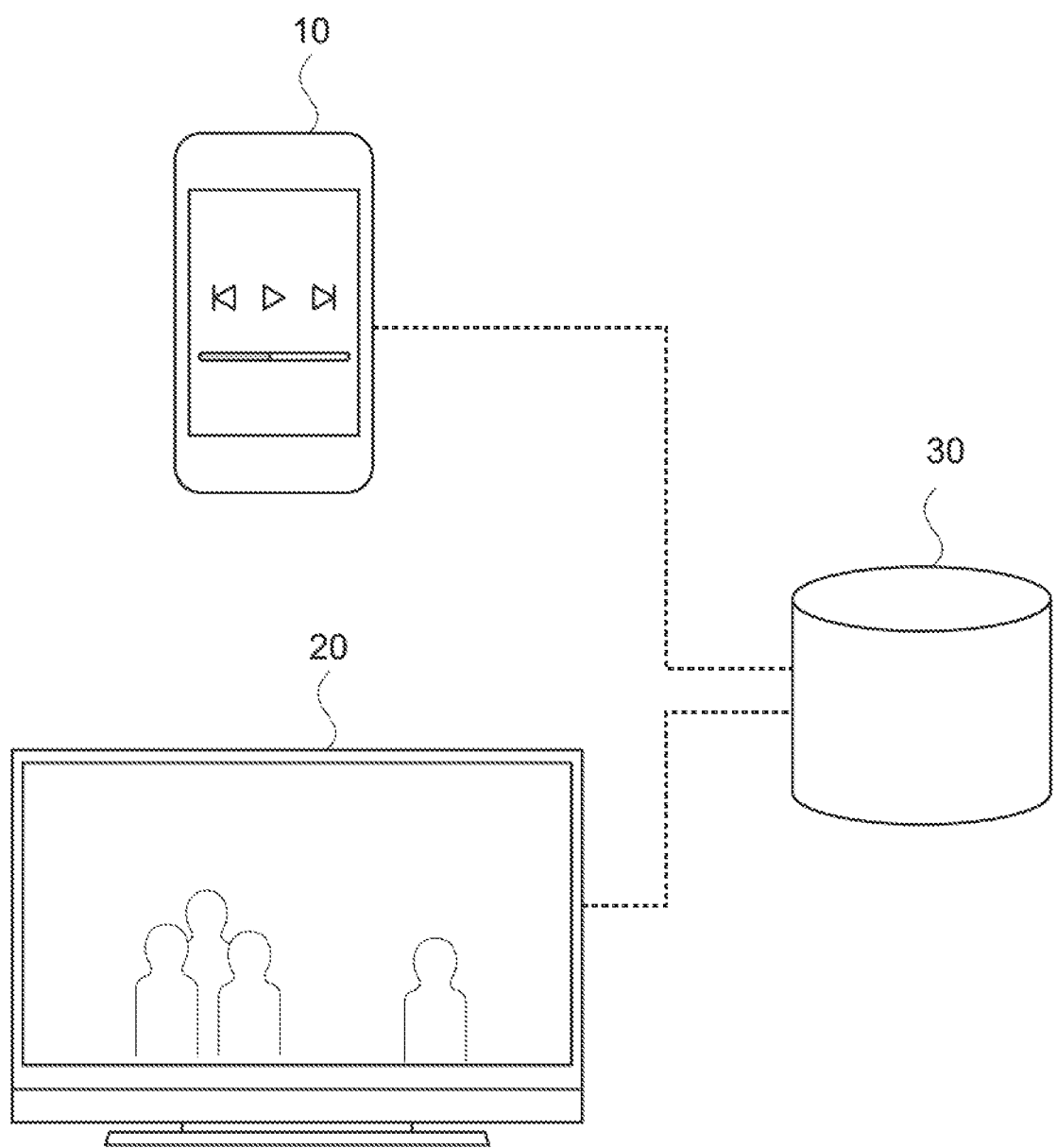
FIG. 7 is a schematic diagram showing operation of the information processing system.

FIG. 6 is a sequence diagram showing operation of the information processing system 1. FIG. 7 is a conceptual diagram showing operation of the information processing system 1. In the following description, an example of commands and information that are exchanged among the information processing apparatus 10, the information processing apparatus 20, and the server 30 is shown in parentheses.

First, the identifier acquisition unit 11 inquires from the identifier transmission unit 21 about identification information (getSystemInformation). The identifier transmission unit 21 transmits a second device identifier (Id2) to the identifier acquisition unit 11. The identifier acquisition unit 11 supplies the second device identifier (Id2) to the application specifier generation unit 12.

The application specifier generation unit 12 adds a "first device identifier (Id1)", the "second device identifier (Id2)", and "first role information (Role:Contorol)" to a "content specifier (WebAppURL)" to thereby generate a "first application specifier (URL1)". Further, the application specifier generation unit 12 adds the "second device identifier (Id2)" and "second role information (Role: View)" to the "content specifier (WebAppURL)" to thereby generate a "second application specifier (URL2)". The application specifier generation unit 12 supplies the first application specifier (URL1) and the second application specifier (URL2) to the application specifier transmission unit 13.

The application specifier transmission unit 13 transmits the second application specifier (URL2) to the application specifier reception unit 22 (SendContentUrl (URL2)). The application specifier reception unit 22 supplies the second application specifier (URL2) to the application specifier transmission unit 23.

The application specifier transmission unit 23 transmits the second application specifier (URL2) to the application specifier reception unit 31 (HTTP Get (URL2)). The application specifier reception unit 31 supplies the second application specifier (URL2) to the application cooperation unit 32.

The application cooperation unit 32 selects an application, corresponding to the second role information (Role:View), of content specified by the content specifier (WebAppURL) included in the second application specifier (URL2), as a "second application". Here, since the second role information is "View", an application for display is set to the second application. The application cooperation unit 32 supplies the second application to the application transmission unit 33. It should be noted that the application cooperation unit 32 holds the second device identifier (Id2) included in the second application specifier.

The application transmission unit 33 transmits the second application (web application for display) to the application reception unit 24. In such a manner, the information processing apparatus 20 can receive the second application. The information processing apparatus 20 operates the received second application. FIG. 7 shows an example of an image (moving image that is being reproduced by a moving image reproduction application) displayed by the second application on the display of the information processing apparatus 20.

Further, the application specifier transmission unit 13 transmits the first application specifier (URL1) to the application specifier reception unit 31 (HTTP Get (URL1)). The application specifier reception unit 31 supplies the first application specifier (URL1) to the application cooperation unit 32.

The application cooperation unit 32 can determine that the information processing apparatus 10 and the information processing apparatus 20 are being used at the same time on the basis of the fact that the second device identifier (Id2) included in the first application specifier (URL1) is identical to the second device identifier (Id2) included in the second application specifier (URL2).

The application cooperation unit 32 selects an application, corresponding to the first role information (Role:Control), of the content specified by the content specifier (WebAppURL) included in the first application specifier (URL1), as a "first application". Here, since the first role information is "Control", an application for operation can be set to the first application. The application cooperation unit 32 supplies the first application to the application transmission unit 33.

The application transmission unit 33 transmits the first application (web application for operation) to the application reception unit 14. The information processing apparatus 10 operates the received first application. FIG. 7 shows an example of an image (interface for operating a moving image reproduction application) displayed by the first application on the display of the information processing apparatus 10.

It should be noted that the information processing apparatus 10 first transmits the second application specifier (URL2) to the application specifier reception unit 22 and then transmits the first application specifier (URL1) to the application specifier reception unit 31, but the order of transmission may be reversed.

The information processing system 1 performs the operation as described above. In the case where a user uses the information processing apparatus 10 to access content on the server 30, a first application specifier is transmitted from the information processing apparatus 10 to the server 30 and a second application specifier is transmitted from the information processing apparatus 20 to the server 30. Therefore, by operating only the information processing apparatus 10, the user can cause the information processing apparatus 10 to acquire a first application and cause the information processing apparatus 20 to acquire a second application.

Further, since the first application and the second application are coordinated with each other by the server 30 on the basis of the second device identifier, the user can operate the information processing apparatus 10 and the information processing apparatus 20 in cooperation with each other. In addition, since the first application and the second application are selected in accordance with the first role information and the second role information, the user can cause each of the information processing apparatus 10 and the information processing apparatus 20 to acquire an application corresponding to a role thereof.

In this embodiment, the application specifier generation unit 12 adds the "first device identifier", the "second device identifier", and the "first role information" to the "content specifier" to thereby generate the "first application specifier". Further, the application specifier generation unit 12 adds the "second device identifier" and the "second role information" to the "content specifier" to thereby generate the "second application specifier".

However, the application specifier generation unit 12 may add only the "first device identifier" and the "second device identifier" to the "content specifier" to thereby generate the first application specifier, and add only the "second device identifier" to the "content specifier" to thereby generate the second application specifier. In this case, the first role information is not included in the first application specifier, and the second role information is not included in the second application specifier. Therefore, it is difficult to cause each of the information processing apparatus 10 and the information processing apparatus 20 to acquire an application corresponding to role information thereof. However, it is possible to cause the information processing apparatus 10 and the information processing apparatus 20 to acquire an (identical) application coordinated between the information processing apparatus 10 and the information processing apparatus 20, that is, to cause the information processing apparatus 10 and the information processing apparatus 20 to be coordinated with each other.

Second Embodiment

An information processing system according to a second embodiment of the present disclosure will be described. In this embodiment, a case where one more information processing apparatus is additionally provided to constitute the information processing system will be described. In this embodiment, description on the same configuration as that of the first embodiment will be omitted.

<Configuration of Information Processing System>

Figure 8:
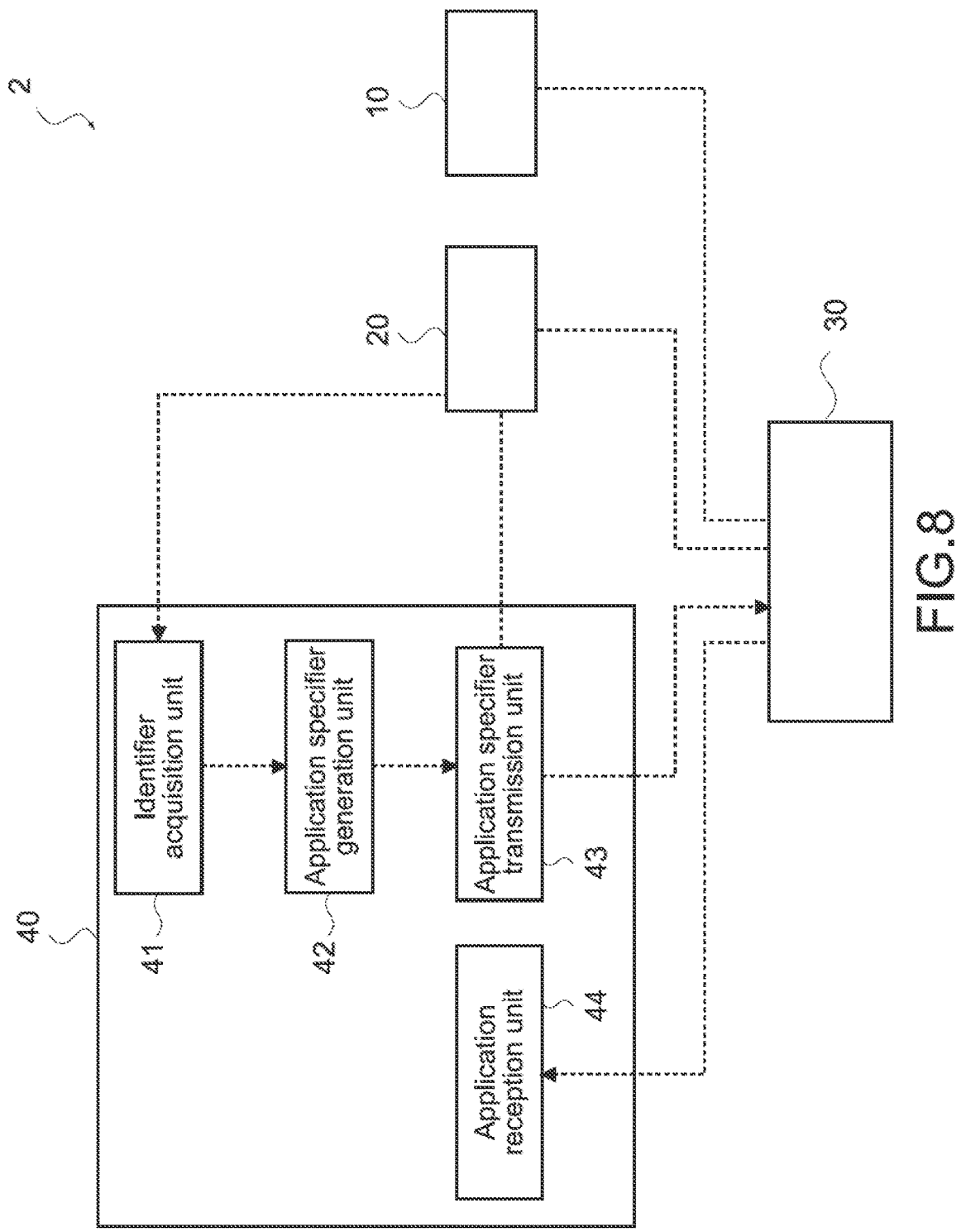
FIG. 8 is a block diagram showing a functional configuration of an information processing system according to a second embodiment of the present disclosure.

FIG. 8 is a block diagram showing a functional configuration of an information processing system 2 according to the second embodiment. As shown in FIG. 8, in the information processing system 2, an information processing apparatus 40 is provided in addition to the information processing apparatus 10, the information processing apparatus 20, and the server 30.

As shown in FIG. 8, the third information processing apparatus 40 includes an identifier acquisition unit 41, an application specifier generation unit 42, an application specifier transmission unit 43, and an application reception unit 44. The identifier acquisition unit 41 is connected to the application specifier generation unit 42. The application specifier generation unit 42 is connected to the application specifier transmission unit 43.

The identifier acquisition unit 41 acquires a "second device identifier", which is a device identifier of the information processing apparatus 20, from the information processing apparatus 20. The identifier acquisition unit 41 supplies the acquired second device identifier to the application specifier generation unit 42.

The application specifier generation unit 42 generates a "third application specifier". The third application specifier is an application specifier for the information processing apparatus 40 and is generated using a "content specifier", a "third device identifier", a "second device identifier", and "third role information". The content specifier can be the same as that of the first application specifier and the second application specifier.

The third device identifier is a device identifier of the information processing apparatus 40 and can be held in advance by the information processing apparatus 40. Further, the third device identifier can be assigned by the server 30.

The third role information is information that indicates a role of the information processing apparatus 40, and may be the same as the first role information or may be different from the first role information. The third role information can be specified by a user.

The application specifier generation unit 42 adds the "third device identifier", the "second device identifier", and the "third role information" to the "content specifier" to thereby generate a "third application specifier". The application specifier generation unit 42 supplies the generated third application specifier to the application specifier transmission unit 43.

The application specifier transmission unit 43 transmits the third application specifier to the server 30.

The application reception unit 44 receives a third application output from the server 30. The third application will be described later in detail. The information processing apparatus 40 operates the received third application.

The information processing apparatus 40 has the functional configuration as described above. Such a functional configuration of the information processing apparatus 40 is achieved by a hardware configuration that is the same as that of the information processing apparatus 10 described above.

<Operation of Information Processing System>

Figure 9:
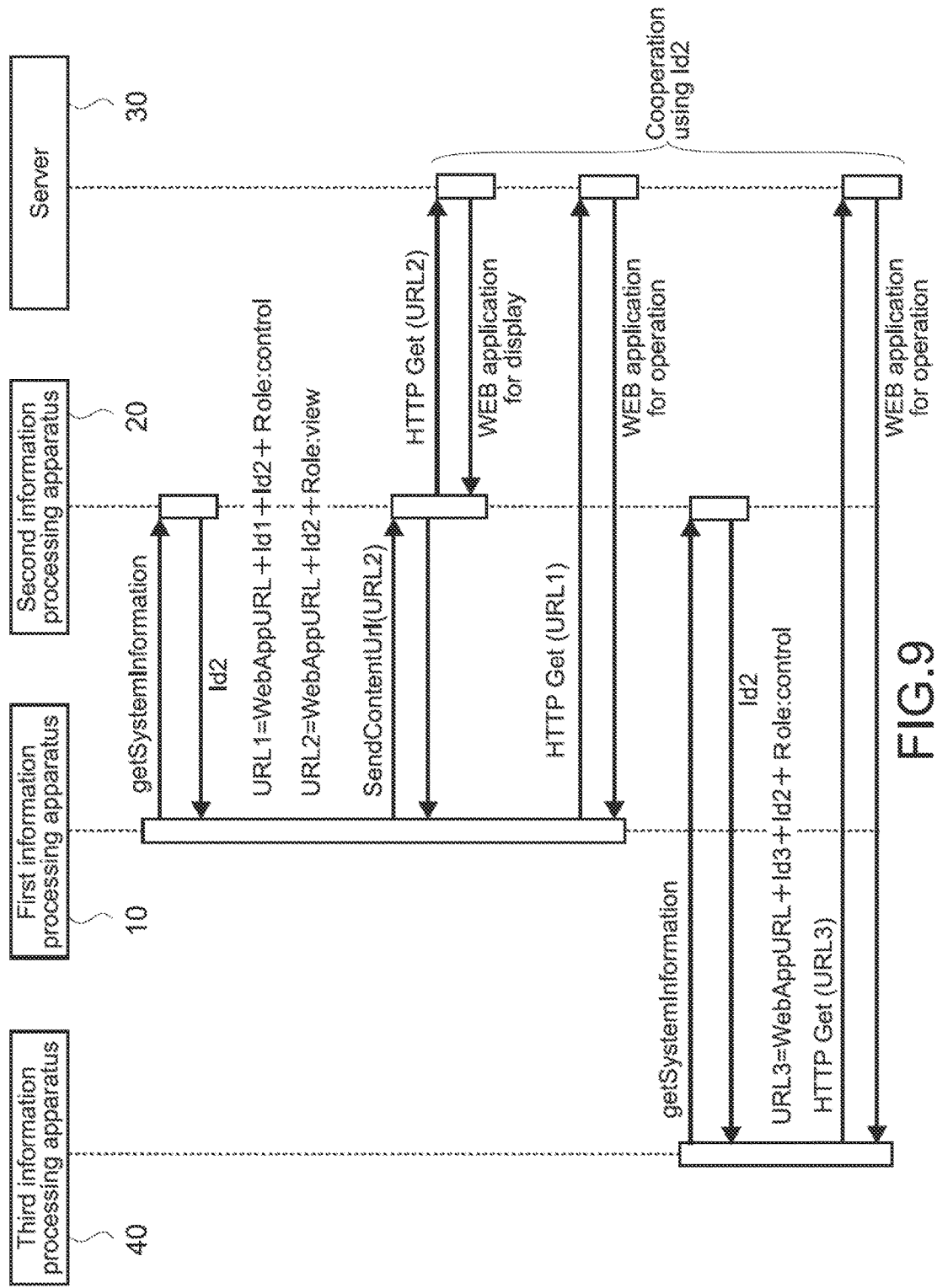
FIG. 9 is a sequence diagram showing operation of the information processing system.
Figure 10:
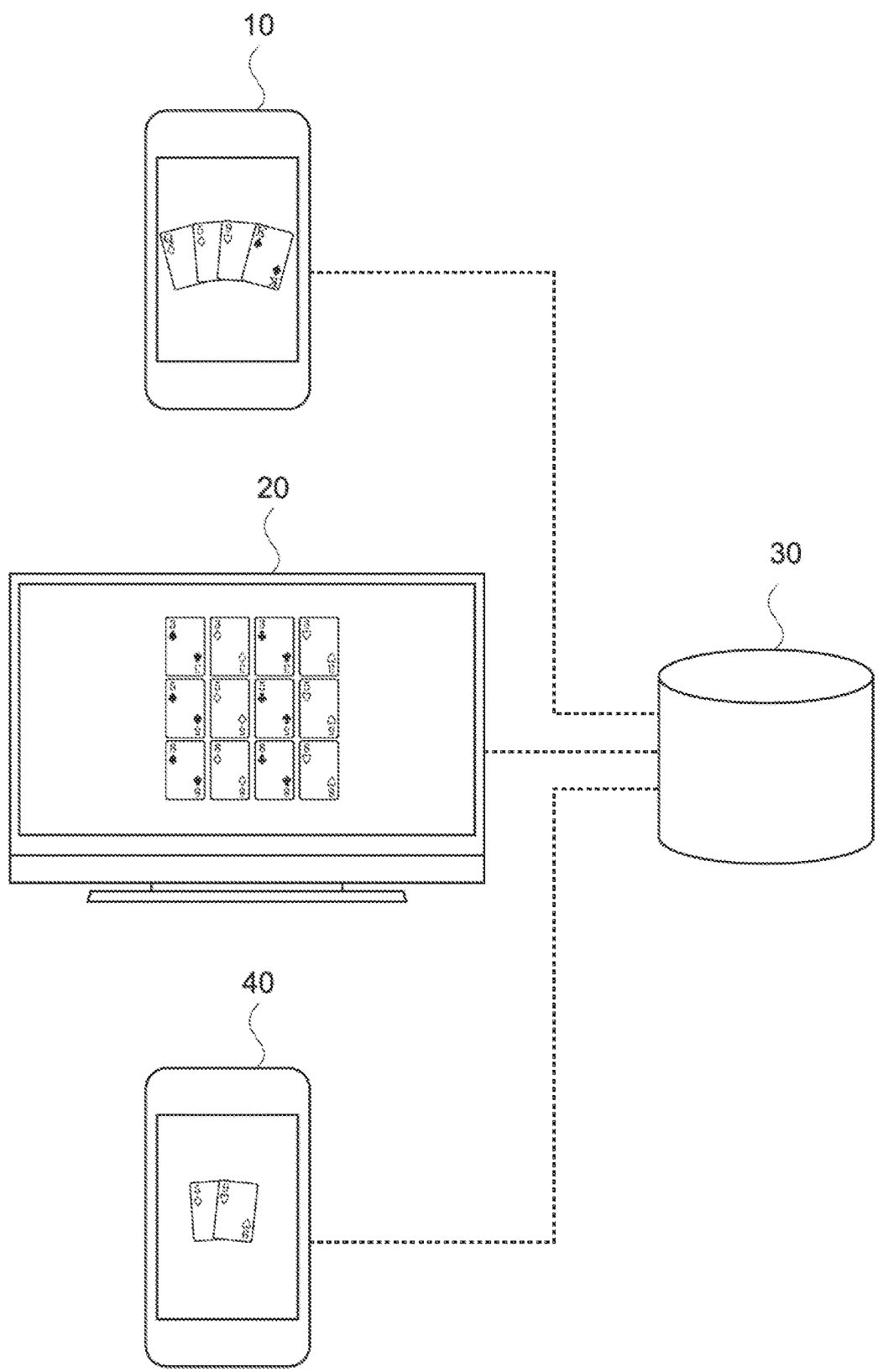
FIG. 10 is a schematic diagram showing operation of the information processing system.

FIG. 9 is a sequence diagram showing operation of the information processing system 2. FIG. 10 is a conceptual diagram showing operation of the information processing system 2. In the following description, an example of commands and information that are exchanged among the information processing apparatus 10, the information processing apparatus 20, the information processing apparatus 40, and the server 30 is shown in parentheses.

Processing up to when the information processing apparatus 10 acquires the first application is the same as in the first embodiment. Specifically, the identifier acquisition unit 11 inquires from the identifier transmission unit 21 about identification information (getSystemInformation) and acquires a second device identifier (Id2).

The application specifier generation unit 12 generates a "first application specifier (URL1)" and a "second application specifier (URL2)". The application specifier generation unit 12 supplies the first application specifier (URL1) and the second application specifier (URL2) to the application specifier transmission unit 13.

The application specifier transmission unit 13 transmits the second application specifier (URL2) to the application specifier reception unit 22 (SendContentUrl (URL2)), and the application specifier reception unit 22 supplies the second application specifier (URL2) to the application specifier transmission unit 23.

The application specifier transmission unit 23 transmits the second application specifier (URL2) to the application specifier reception unit 31 (HTTP Get (URL2)). The application specifier reception unit 31 supplies the second application specifier (URL2) to the application cooperation unit 32.

The application cooperation unit 32 selects a "second application" in accordance with the second application specifier (URL2) and supplies the "second application" to the application transmission unit 33. It should be noted that the application cooperation unit 32 holds the second device identifier (Id2) included in the second application specifier.

The application transmission unit 33 transmits the second application (web application for display) to the application reception unit 24. In such a manner, the information processing apparatus 20 can receive the second application. The information processing apparatus 20 operates the received second application. FIG. 10 shows an example of an image (stock in a card game) displayed by the second application on the display of the information processing apparatus 20.

Subsequently, the application specifier transmission unit 13 transmits the first application specifier (URL1) to the application specifier reception unit 31 (HTTP Get (URL1)). The application specifier reception unit 31 supplies the first application specifier (URL1) to the application cooperation unit 32.

The application cooperation unit 32 can determine that the information processing apparatus 10 and the information processing apparatus 20 are being used at the same time on the basis of the fact that the second device identifier (Id2) included in the first application specifier (URL1) is identical to the second device identifier (Id2) included in the second application specifier (URL2).

The application cooperation unit 32 selects an application, corresponding to the first role information (Role:Control), of the content specified by the content specifier (WebAppURL) included in the first application specifier (URL1), as a "first application". The application cooperation unit 32 supplies the first application to the application transmission unit 33. It should be noted that the application cooperation unit 32 holds the second device identifier (Id2) included in the first application specifier.

The application transmission unit 33 transmits the first application (web application for operation) to the application reception unit 14. The information processing apparatus 10 operates the received first application. FIG. 10 shows an example of an image (hand in a card game) displayed by the first application on the display of the information processing apparatus 10.

Next, the identifier acquisition unit 41 inquires from the identifier transmission unit 21 about identification information (getSystemInformation). The identifier transmission unit 21 transmits the second device identifier (Id2) to the identifier acquisition unit 41. The identifier acquisition unit 41 supplies the second device identifier (Id2) to the application specifier generation unit 42.

The application specifier generation unit 42 adds a "third device identifier (Id3)", the "second device identifier (Id2)", and "third role information (Role:Contorol)" to the "content specifier (WebAppURL)" to thereby generate a "third application specifier (URL3)". It should be noted that the third role information may be different from the first role information and the second role information. The application specifier generation unit 42 supplies the third application specifier (URL3) to the application specifier transmission unit 43.

The application specifier transmission unit 43 transmits the third application specifier (URL3) to the application specifier reception unit 31 (HTTP Get (URL3)). The application specifier reception unit 31 supplies the third application specifier (URL3) to the application cooperation unit 32.

The application cooperation unit 32 can determine that the information processing apparatus 40, the information processing apparatus 20, and the information processing apparatus 10 are being used at the same time on the basis of the fact that the second device identifier (Id2) included in the third application specifier (URL3) is identical to the second device identifier (Id2) included in the second application specifier (URL2) and the first application specifier (URL1).

The application cooperation unit 32 selects an application, corresponding to the third role information (Role:Control), of the content specified by the content specifier (WebAppURL) included in the third application specifier (URL3), as a "third application". The application cooperation unit 32 supplies the third application to the application transmission unit 33.

Here, the third application has role information that is the same as the first application ("Control" in both applications), but it may have different role information from that of the first application. The server 30 can recognize that the information processing apparatus 10 and the information processing apparatus 40 are different information processing apparatuses on the basis of the third device identifier (Id3) included in the third application specifier (URL3) and can select an application corresponding to each of the information processing apparatuses.

The application transmission unit 33 transmits the third application (web application for operation) to the application reception unit 44. The information processing apparatus 40 operates the received third application. FIG. 10 shows an example of an image (hand in a card game, which is different from the image of the information processing apparatus 10) displayed by the third application on the display of the information processing apparatus 40.

It should be noted that the application specifier generation unit 42 generates the third application specifier (URL3), but in addition thereto, the application specifier generation unit 42 can generate the second application specifier (URL2) for the information processing apparatus 20. In this case, the application specifier transmission unit 43 transmits the second application specifier (URL2) to the application specifier reception unit 22, and the application specifier transmission unit 23 transmits the second application specifier (URL2) to the application specifier reception unit 31. Accordingly, by operating the information processing apparatus 40 similarly to the information processing apparatus 10, the user can cause the information processing apparatus 20 to acquire an application.

The information processing system 2 performs the operation as described above. When the user uses the information processing apparatus 40 to access content on the server 30, the user can cause the information processing apparatus 40 to acquire a third application coordinated with the first application and the second application. In other words, the user can cause the information processing apparatus 10, the information processing apparatus 20, and the information processing apparatus 40 to operate in cooperation with one another.

Further, the first application, the second application, and the third application are generated in accordance with the first role information, the second role information, and the third role information, respectively. Therefore, the user can cause each of the information processing apparatus 10, the information processing apparatus 20, and the information processing apparatus 40 to acquire an application corresponding to a role thereof.

The present disclosure is not limited to the embodiments described above and can be modified without departing from the gist of the present disclosure. As used herein, the indefinite articles "a" and "an" mean "one or more" in open-ended claims containing the transitional phrase "comprising," "including," and/or "having."

It should be noted that the present disclosure can adopt the following configurations.

(1) An information processing device, comprising:
an identifier acquisition unit configured to receive an identifier of an associated device;
an application specifier generation unit configured to generate:
a first application specifier identifying a first application corresponding to the information processing device; and
a second application specifier based on the received identifier and identifying a second application corresponding to the associated device;
a transmission unit configured to transmit the first and second application specifiers to a server; and
an application reception unit configured to receive the first application.

(2) The information processing device of (1), wherein the transmission unit is configured to transmit the second application specifier to the associated device.

(3) The information processing device of (1) or (2), wherein the application specifier generation unit is configured to generate the first application specifier based on the received identifier.

(4) An information processing system, comprising:
an associated information processing device; and
an information processing device, comprising:
an identifier acquisition unit configured to receive an identifier of the associated device;
an application specifier generation unit configured to generate:
a first application specifier identifying a first application corresponding to the information processing device; and
a second application specifier based on the received identifier of the associated device and identifying a second application corresponding to the associated device;
a transmission unit configured to transmit the first and second application specifiers to a server; and
an application reception unit configured to receive the first application from the server.

(5) The information processing system of (4), wherein the application specifier generation unit is configured to generate the first application specifier based on the received identifier of the associated device.

(6) The information processing system of (4) or (5), wherein the transmission unit is configured to transmit the second application specifier to the associated device.

(7) The information processing system of any one of (4) to (6), wherein the associated information processing device comprises:
an identifier transmission unit configured to transmit the identifier of the associated device to the identifier acquisition unit;
an application specifier reception unit configured to receive the second application specifier;
an associated device transmission unit configured to transmit the second application specifier to the server; and
an associated device application reception unit configured to receive the second application from the server.

(8) The information processing system of (7) further comprising a server, the server comprising:
an application cooperation unit configured to:
select the first application based on the first application specifier; and select the second application based on the second application specifier.

(9) The information processing system of (8), wherein the server further comprises:
an server application specifier reception unit configured to receive the first and second application specifiers; and
an application transmission unit configured to:
transmit the first application to the information processing device; and
transmit the second application to the associated information processing device.

(10) The information processing system of (8) or (9), wherein the application cooperation unit is configured to:
store the identifier of the associated device; and
determine whether the information processing apparatus and the associated information processing apparatus are being used at the same time.

(11) The information processing system of (7) or (8), wherein the first application specifier is based on a first role information item that indicates a role of the information processing device, and
the second application specifier is based on a second role information item that indicates a role of the associated information processing device, wherein the server comprises:
an application cooperation unit configured to:
select a first application based on the first role information item; and
select a second application based on the second role information item.

(12) The information processing system of (11), wherein the server further comprises:
a server application specifier reception unit configured to receive the first and second application specifiers; and
a server application transmission unit configured to:
transmit the first application to the information processing device; and transmit the second application to the associated information processing device.

(13) The information processing system of any one of (4) to (7), wherein:
the first application specifier is based on a first role information item that indicates a role of the information processing device; and
the second application specifier is based on a second role information item that indicates a role of the associated information processing device.

(14) The information processing system of (13), wherein
the first role information is control information indicating that the information processing device is a controller, and wherein
the second role information is view information indicating that the associated information processing device is a viewer.

(15) The information processing system of any one of (4) to (7), or (13), wherein the application specifier generation unit is further configured to:
generate the first application specifier, based on an identifier of the information processing device, the identifier of the associated information processing device, and first role information to a content specifier; and
generate the second application specifier based on the identifier of the associated information processing device and second role information to the content specifier;
the first and second role information items respectively indicate a role of the information processing device and a role of the associated information processing device; and
the content specifier specifies a location of content in the server.

(16) The information processing system of any one of (4) to (7), (13) or (15) wherein at least one of the information processing device and the associated information processing device is selected from the group consisting of a personal digital assistant, a tablet personal computer, a stationary personal computer, a television receiver having a network connection function, and an audio device.

(17) An information processing system, comprising:
a server; and
an information processing device in communication with the server, wherein the information processing device comprises:
an identifier acquisition unit configured to receive an identifier of an associated device;
an application specifier generation unit configured to generate:
a first application specifier identifying a first application corresponding to the information processing device; and
a second application specifier based on the received identifier and identifying a second application corresponding to the associated device;
a transmission unit configured to transmit the first and second application specifiers to the server; and
an application reception unit configured to receive the first application.

(18) An information processing device, comprising:
an identifier transmission unit configured to transmit an identifier of the device;
an application specifier reception unit configured to receive an application specifier identifying a second application corresponding to the device;
a transmission unit configured to transmit the application specifier to a server; and
an application reception unit configured to receive the application.

(19) A method of accessing content on a network, comprising: receiving an identifier of a device associated with an information processing device;
generating a first application specifier identifying a first application corresponding to the information processing device, and generating a second application specifier based on the received identifier and identifying a second application corresponding to the associated device;
transmitting the first and second application specifiers to a server; and
receiving the first application in the information processing device.

(20) A non-transitory computer-readable medium comprising a program for causing a computer to function as:
a unit for receiving an identifier of an associated device;
a unit for generating:
a first application specifier identifying a first application corresponding to an information processing device; and
a second application specifier based on the received identifier and identifying a second application corresponding to the associated device;
a unit for transmitting the first and second application specifiers to a server; and
a unit for receiving the first application.

In addition, the technology is also configured as follows.
(1) An information processing apparatus, including:
an identifier acquisition unit configured to acquire a device identifier of another information processing apparatus;
an application specifier generation unit configured to add a device identifier of the information processing apparatus as a first device identifier and the device identifier of the other information processing apparatus as a second device identifier to a content specifier that specifies a location of content on a server to generate a first application specifier, and add the second device identifier to the content specifier to generate a second application specifier;

an application specifier transmission unit configured to transmit the first application specifier to the server and transmit the second application specifier to the other information processing apparatus; and an application reception unit configured to receive an application transmitted from the server.

(2) The information processing apparatus according to Item (1), in which the application specifier generation unit adds the first device identifier, the second device identifier, and first role information that indicates a role of the information processing apparatus to the content specifier to generate a first application specifier, and adds the second device identifier and second role information that indicate a role of the other information processing apparatus to the content specifier to generate a second application specifier.

(3) An information processing system, including:

an first information processing apparatus;

a second information processing apparatus; and a server, the first information processing apparatus including an identifier acquisition unit to acquire a device identifier of the second information processing apparatus, an application specifier generation unit to add a device identifier of the first information processing apparatus as a first device identifier and the device identifier of the second information processing apparatus as a second device identifier to a content specifier that specifies a location of content on a server to generate a first application specifier, and add the second device identifier to the content specifier to generate a second application specifier, a first application specifier transmission unit to transmit the first application specifier to the server and transmit the second application specifier to the second information processing apparatus, and a first application reception unit to receive a first application transmitted from the server, the second information processing apparatus including a first application specifier reception unit to receive the second application specifier transmitted from the first application specifier transmission unit, a second application specifier transmission unit to transmit the second application specifier to the server, and a second application reception unit to receive a second application transmitted from the server, the server including a second application specifier reception unit to receive the first application specifier transmitted from the first application specifier transmission unit and the second application specifier transmitted from the second application specifier transmission unit, an application cooperation unit to receive the second device identifier included in the first application specifier and the second application specifier to coordinate the first application and the second application with each other, the first application and the second application being included in the content, and an application transmission unit to transmit the first application to the first application reception unit and transmit the second application to the second application reception unit.

(4) The information processing system according to Item (3), in which the application specifier generation unit adds the first device identifier, the second device identifier, and first role information that indicates a role of the first information processing apparatus to the content specifier to generate a first application specifier, and adds the second device identifier and second role information that indicates a role of the second information processing apparatus to the content specifier to generate a second application specifier.

(5) The information processing system according to Item (3) or (4), in which the first information processing apparatus is a handheld information processing apparatus, the second information processing apparatus is a stationary information processing apparatus, the first role information is information indicating that the first information processing apparatus is an information processing apparatus for operating the content, and the second role information is information indicating that the second information processing apparatus is an information processing apparatus for viewing the content.

(6) A program causing an information processing apparatus to function as:

an identifier acquisition unit to acquire a device identifier of another information processing apparatus;

an application specifier generation unit to add a device identifier of the information processing apparatus as a first device identifier and the device identifier of the other information processing apparatus as a second device identifier to a content specifier that specifies a location of content on a server to generate a first application specifier, and add the second device identifier to the content specifier to generate a second application specifier;

an application specifier transmission unit to transmit the first application specifier to the server and transmit the second application specifier to the other information processing apparatus; and an application reception unit to receive an application transmitted from the server.

The present application contains subject matter related to that disclosed in Japanese Priority Patent Application JP 2011-132071 filed in the Japan Patent Office on Jun. 14, 2011, the entire content of which is hereby incorporated by reference.

REFERENCE SIGNS LIST

1,2 information processing system
10 first information processing apparatus
11 identifier acquisition unit
12 application specifier generation unit
13 application specifier transmission unit
14 application reception unit
20 second information processing apparatus
21 identifier transmission unit
22 application specifier reception unit 23 application specifier transmission unit
24 application reception unit
30 server
31 application specifier reception unit
32 application cooperation unit
33 application transmission unit

What is claimed is:

1. An information processing device comprising:
a memory device having a program stored therein;
a central processing unit (CPU) which, upon executing the stored program from the memory, operates
to receive, from an associated device, an identifier of an associated device, and
to generate a first application specifier identifying a first application and a second application specifier identifying a second application; and
a first interface device and a second interface device, during operation,
(i) the CPU adds an identifier of the information processing device, the received identifier of the associated device, a content specifier, and a first role information item that indicates a role of the information processing device to generate the first application specifier,
(ii) the CPU adds the received identifier of the associated device, a second role information item that indicates a role of the associated device, and the content specifier, without the identifier of the information processing device, to generate the second application specifier,
such that the received identifier of the associated device and the content specifier are included in both the first application specifier and the second application specifier,
(iii) the first application specifier having the identifier of the information processing device, the received identifier of the associated device, the content specifier, and the first role information item are transmitted by way of the first interface device for receipt by a server for selection by the server of the first application,
(iv) the second application specifier having the received identifier of the associated device, the second role information item, and the content specifier, without the identifier of the information processing device, are transmitted by way of the second interface device to the associated device, for receipt by the server from the associated device, said second application specifier being used by the server for selection of the second application for the associated device, and
(v) the first application is received from the server by way of the first interface device.

2. The information processing system of claim 1, in which the first role information is control information indicating that the information processing device is a controller, and the second role information is view information indicating that the associated information processing device is a viewer.

3. An information processing system comprising:
an associated information processing device; and
an information processing device having a memory device having a program stored therein;
a central processing unit (CPU) which, upon executing the stored program from the memory, operates
to receive an identifier of the associated information processing device,
to generate a first application specifier identifying a first application and a second application specifier identifying a second application; and
a first interface device and a second interface device, during operation, (i) the CPU adds an identifier of the information processing device, the received identifier of the associated information processing device, a content specifier to generate the first application specifier, and a first role information item that indicates a role of the information processing device,
(ii) the CPU adds the received identifier of the associated information processing device, a second role information item that indicates a role of the associated information processing device, and the content specifier, without the identifier of the information processing device, to generate the second application specifier,
such that the received identifier of the associated information processing device and the content specifier are included in both the first application specifier and the second application specifier,
(iii) the first application specifier having the identifier of the information processing device, the received identifier of the associated information processing device, the content specifier, and the first role information item are transmitted by way of the first interface device for receipt by a server,
(iv) the second application specifier having the received identifier of the associated information processing device, the second role information item, and the content specifier, without the identifier of the information processing device, are transmitted by way of the second interface device to the associated information processing device without transmitting the second application specifier for receipt by the server,
(v) the first application is received from the server by way of the first interface device,
(vi) the associated information processing device transmits the identifier of the associated device to the information processing device, receives the second application specifier, transmits the second application specifier for receipt by the server, and receives the second application from the server, and
(vii) the server selects the first application based on the first application specifier, and selects the second application based on the second application specifier.

4. The information processing system of claim 3, in which the associated information processing device includes a second memory device having a second program stored therein; and a second central processing unit (CPU).

5. The information processing system of claim 4, in which the server includes a third memory device having a third program stored therein; and a third central processing unit (CPU).

6. The information processing system of claim 3, wherein at least one of the information processing device and the associated information processing device is selected from the group consisting of a personal digital assistant, a tablet personal computer, a stationary personal computer, a television receiver having a network connection function, and an audio device.

7. An information processing system comprising:
a server; and
an information processing device communicable with the server, the information processing device having
a memory device having a program stored therein;
a central processing unit (CPU) which, upon executing the stored program from the memory, operates
to receive an identifier of an associated information processing device, and to generate a first application specifier identifying a first application and a second application specifier identifying a second application; and a first interface device and a second interface device, during operation, (i) the CPU adds an identifier of the information processing device, the received identifier of the associated information processing device, a content specifier, and a first role information item that indicates a role of the information processing device to generate the first application specifier, (ii) the CPU adds the received identifier of the associated information processing device, a second role information item that indicates a role of the associated information processing device, and the content specifier, without the identifier of the information processing device, to generate the second application specifier, such that the received identifier of the associated information processing device and the content specifier are included in both the first application specifier and the second application specifier, (iii) the first application specifier having the identifier of the information processing device, the received identifier of the associated information processing device, the content specifier, and the first role information item are transmitted by way of the first interface device to the server, (iv) the second application specifier having the received identifier of the associated information processing device, the second role information item, and the content specifier, without the identifier of the information processing device, are transmitted by way of the second interface device to the associated information processing device without transmitting the second application specifier to the server, (v) the first application is received from the server by way of the first interface device, (vi) the associated information processing device transmits the identifier of the associated device to the information processing device, receives the second application specifier, transmits the second application specifier for receipt by the server, and receives the second application from the server, and (vii) the server selects the first application based on the first application specifier, and selects the second application based on the second application specifier.

8. A method of accessing content on a network for use with an information processing device, said method comprising:

receiving, from an associated information processing device, an identifier of the associated information processing device;

generating a first application specifier identifying a first application and a second application specifier identifying a second application, in which (i) an identifier of the information processing device, the received identifier of the associated information processing device, a content specifier, and a first role information item that indicates a role of the information processing device are added to generate the first application specifier, (ii) the received identifier of the associated information processing device, a second role information item that indicates a role of the associated information processing device, and the content specifier, without the identifier of the information processing device, are added to generate the second application specifier, such that the received identifier of the associated information processing device and the content specifier are included in both the first application specifier and the second application specifier;

transmitting the first application specifier having the identifier of the information processing device, the received identifier of the associated information processing device, the content specifier, and the first role information item for receipt by a server for selection, by the server of the first application;

transmitting the second application specifier having the received identifier of the associated information processing device, the second role information item, and the content specifier, without the identifier of the information processing device, to the associated information processing device for transmission from the information processing device to the server, said second application specifier being used by the server for selection of the second application for the associated device; and receiving the first application from the server.

9. A non-transitory computer-readable medium having stored thereon a program for use by a computer of an information processing device which upon execution causes the computer to:

receive, from an associated information processing device, an identifier of the associated information processing device;

generate a first application specifier identifying a first application and a second application specifier identifying a second application, in which (i) an identifier of the information processing device, the received identifier of the associated information processing device, a content specifier, and a first role information item that indicates a role of the information processing device are added to generate the first application specifier, (ii) the received identifier of the associated information processing device, a second role information item that indicates a role of the associated information processing device, and the content specifier, without the identifier of the information processing device, are added to generate the second application specifier, such that the received identifier of the associated information processing device and the content specifier are included in both the first application specifier and the second application specifier;

transmit the first application specifier having the identifier of the information processing device, the received identifier of the associated information processing device, the content specifier, and the first role information item for receipt by a server for selection, by the server of the first application;

transmit the second application specifier having the received identifier of the associated information processing device, the second role information item, and the content specifier, without the identifier of the information processing device, to the associated information processing device for transmission from the information processing device to the server, said second application specifier being used by the server for selection of the second application for the associated device; and receive the first application from the server.

* * * * *